United States Patent [19]

Ichinohe

[11] Patent Number: 4,872,161
[45] Date of Patent: Oct. 3, 1989

[54] BUS CIRCUIT FOR ELIMINATING UNDESIRED VOLTAGE AMPLITUDE

[75] Inventor: Eisuke Ichinohe, Katano, Japan

[73] Assignee: Matsushita Electric Industrial Co., Ltd., Osaka,, Japan

[21] Appl. No.: 171,469

[22] Filed: Mar. 21, 1988

[30] Foreign Application Priority Data

Mar. 19, 1987 [JP] Japan ................................. 62-64518
Mar. 19, 1987 [JP] Japan ................................. 62-64523
Mar. 19, 1987 [JP] Japan ................................. 62-64524

[51] Int. Cl.$^4$ .............................................. H04J 3/14
[52] U.S. Cl. ................................... 370/85.1; 307/443
[58] Field of Search ...................... 370/85; 340/825.5; 365/123, 194; 371/25; 307/443

[56] References Cited

U.S. PATENT DOCUMENTS 4,627,032 12/1986 Kolwicz et al. ..................... 365/233
4,638,311 1/1987 Gerety ................................. 370/85
4,646,272 2/1987 Takasuki .............................. 365/233
4,674,083 6/1987 Rackin ................................. 370/85
4,679,192 7/1987 Vanbrabant ......................... 370/85
4,744,076 5/1988 Elias ..................................... 470/85

Primary Examiner—Douglas W. Olms
Assistant Examiner—Min Jung
Attorney, Agent, or Firm—Wenderoth, Lind & Ponack

[57] ABSTRACT

A bus circuit capable of realizing a high speed data transfer cycle by eliminating undesired voltage amplitude of the data bus lines, includes a plurality of data bus lines, a potential initializing circuit for setting the initial potential of these data bus lines, an output port circuit for delivering data to these data bus lines, and an input port circuit for feeding data from these data bus lines. At least one of the data bus lines is a potential sensing line, and the sensing line is coupled to an inverting output circuit for inverting the initial potential from the output port circuit, and the potential change of this inverting output means is detected by a data firm judging means connected to the sensing line, and the output port circuit is deactivated by a control circuit in accordance with a judgement signal from the data firm judging circuit.

4 Claims, 6 Drawing Sheets

BUS CIRCUIT FOR ELIMINATING UNDESIRED VOLTAGE AMPLITUDE

BACKGROUND OF THE INVENTION

This invention relates to a data bus circuit of a signal processing device.

Generally, various types of signal processing device are composed of a plurality of functional blocks. These functional blocks are coupled with a certain common bus, and through this common bus, data having a certain data width processed in one functional block (for example, 16-bit width, 32-bit width, 64-bit width) is supplied to another functional block.

In the construction of a conventional bus circuit, since data is fed into an input port circuit by continually alternating the large parasitic capacity of the data bus line in full between the supply voltage and grounding voltage, it is difficult to realize a high speed data transfer cycle.

SUMMARY OF THE INVENTION

It is hence a primary object of this invention to present a bus circuit capable of transferring data at a high speed by eliminating the undesired voltage amplitude of the data bus line.

To achieve the above and other objects, this invention presents a bus circuit which comprises: a plurality of data bus lines; potential initializing means for setting the initial potential of the data bus lines, an output port circuit for delivering data to the data bus lines; and an input port circuit for feeding data from the data bus lines. At least one of the data bus lines composes a potential sensing line, and this sensing line possesses an inverting the output means for inverting initial potential through said output port circuit. The potential change of the inverting output means is detected by a data firm judging means connected to the sensing line, and the output port circuit is made inactive by the judgement circuit by control means, so that transfer cycle of data is realized by eliminating unnecessary the voltage amplitude of the data bus lines.

While the novel features of the invention are set forth with particularly in the appended claims, the invention, both as to organization and content, will be better understood and appreciated, along with other objects and features thereof, from the following detailed description taken in conjunction with the drawings.

DETAILED DECRIPTION OF THE INVENTION

Figure 1:
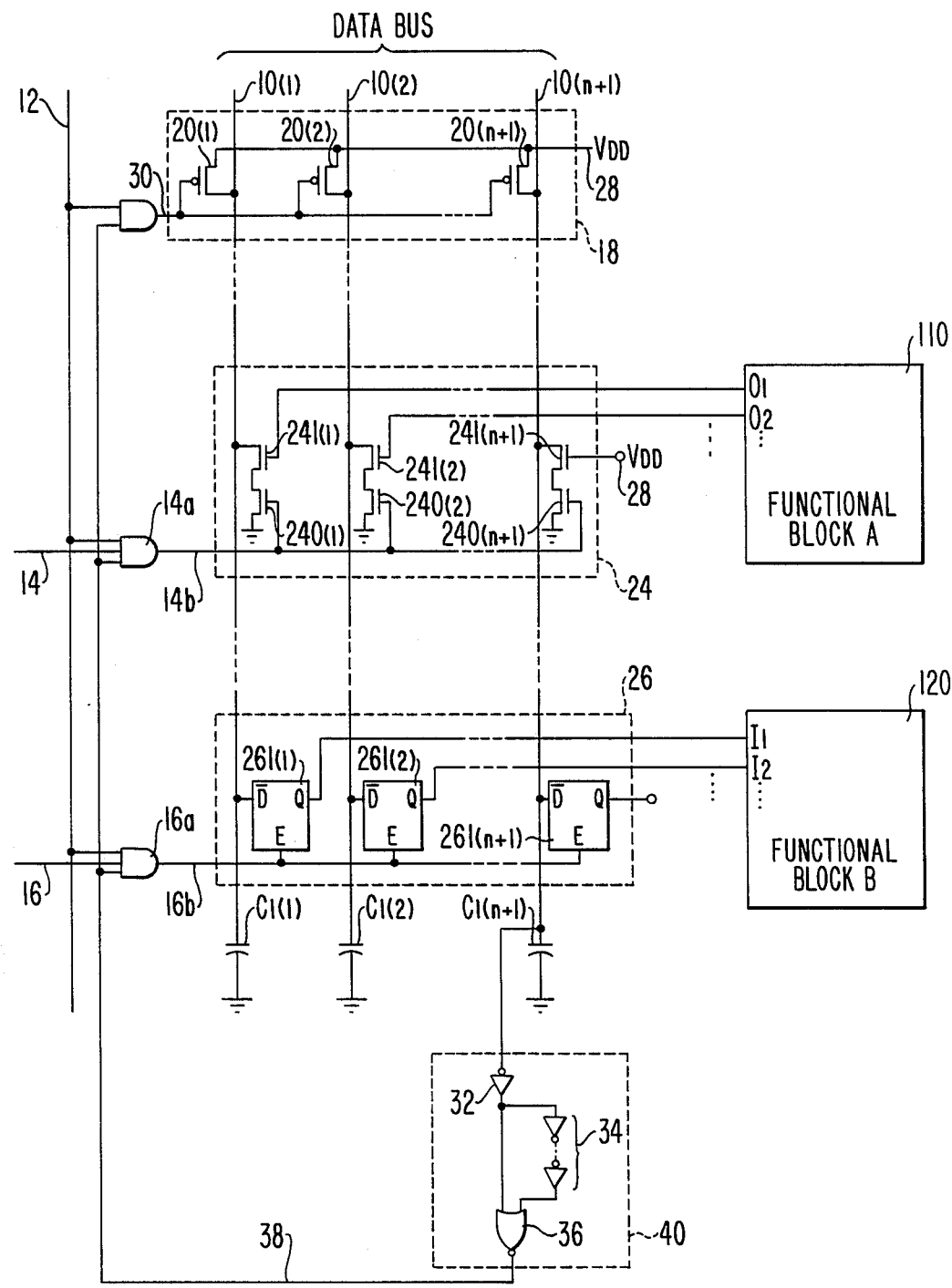
FIG. 1 is a logic diagram showing the schematic structure of a first embodiment of a bus circuit of this invention.

Referring now to FIG. 1, the structure of a first embodiment of this invention is described. In the drawing, reference numerals 10(1) to 10(n) (n: a natural number) are data bus lines and 10(nH) is a sensing line; C1(1) to C1(n+1) are parasitic capacitance; 12 is a synchronous signal line; 14 is an output port control signal line; 16 is an input port control signal line; 18 is a precharge circuit; 24 is an output port circuit; 26 is an input port circuit; 110 is a functional block A; and 120 is a functional block B.

Suppose, for example, data is fed from functional block A 110 into functional block B 120 by way of data bus lines 10(1) to 10(n).

First, the data bus lines 10(1) to 10(n) and the sensing line 10(n+1) are preliminarily charged substantially up to the level of the power supply voltage (V DD) 28 by means of precharge circuit 18.

For instance, when the synchronous signal line 12 is in a LOW state, the output 30 of the AND circuit becomes LOW (=0), and P-channel (Pch) transistors 20(1) to 20(n+1) composing the precharge circuit 18 are turned on, and the parasitic capacities C1(1) to C1(n+1) are charged up to the level of the power supply voltage (V DD) 28. As a result, the data bus lines (10(1) to 10(n+1) are initially set at HIGH (=1). Here, one of the important points of this invention is that the line 10(n+1) acts as a sensing line. This point is described in detail below.

At the same time, the outputs of AND circuits 14a, 16a are LOW (=0), and the output port circuit 24 and input port circuit 26 are kept inactive.

The basic unit of the output circuit 24 is composed of series connection of two N-channel (Nch) transistors. That is, a control signal for activating or deactivating the output port circuit 24 is applied from the AND circuit 14a to the gate of the Nch transistors 240(1) to 240(n+1). Output data of each bit (O1, O2, ..., On, On+1) from the functional block A 110 is connected to the gate of the other Nch transistors 241(1) to 241(n+1).

Accordingly, when the synchronous signal line 12 becomes HIGH (=1), the output of the AND circuit 14a becomes HIGH (=1) and the output port circuit 24 becomes active, the potential of the data bus lines 10(1) to 10(n+1) is determined according to the output data (O1, O2, ..., On, On+1) applied to the gate electrode of the Nch transistor 241 (1) to 241(n+1).

For example, when a certain output data Oi is 1 (=HIGH), the data bus line 10(i) to which this Oi is applied changes from the initial state HIGH (=1) to the LOW (=0) state. Furthermore, this LOW (=0) state is fed into the D-latch circuit composing the input port circuit 26 in which the inverting input is turned to 1 (=LOW), and HIGH (=1) is fed into the functional block B 120. The operation is the same when the output data is 0 (=0).

One the most important points is, as stated above, that the line 10 (n+1) functions as sensing line, that is, the power supply voltage (V DD) 28 is always applied to the Nch transistor 241(n+1) of the basic unit of the output port circuit 24 of this sensing line, and when the output of the AND circuit 14a becomes HIGH (=1), the potential of this sensing line is immediately transferred from a HIGH (=1) to a LOW (=0) state.

Figure 2A:
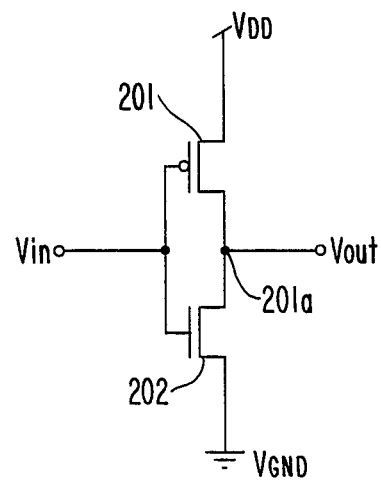
FIGS. 2A and 2B respectively show the circuit diagram and the input and output characteristic of an inverter circuit for detection of a threshold value (Vs) to compose the data firm judging means.
Figure 2B:
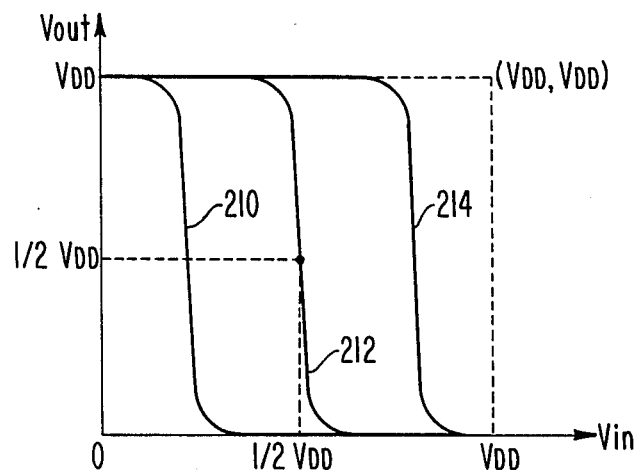

An inverter circuit 32 for detection of threshold (Vs) of the potential is also connected to this sensing line. A practical example of the construction of the inverter circuit 32 and its input and output characteristics are shown in FIGS. 2A and 2B. A general inverter circuit 32 using a complementary MOS (CMOS) transistor circuit is composed of Pch transistor 201 connected to the power supply voltage (V DD) at the source electrode, and Nch transistor 202 connected in series to the supply voltage (V DD) with the source electrode connected to the grounding voltage (V GND). By varying the mutual conductance (gm) of the serially connected Pch transistor 201 and Nch transistor 202, the input and output characteristic varies from curve 210 to curve 214 as shown in FIG. 2B. The following examples are of curve 212 in which the output voltage is V DD at an input voltage of about ½V DD.

By the inverter circuit 32 for detection of the threshold (Vs) having such an input and output characteristic, the output port circuit 24 is made active, and when the sensing line changes from the initial potential (=V DD) to less than nearly ½ V DD, the output of the inverter circuit 32 becomes nearly V DD, i.e., HIGH (=1).

Furthermore, this signal "1" and its delayed signal "1 (Δ)" (delayed by delay circuit 34) are fed into NOT OR circuit 36.

Accordingly, the data firm signal LOW (=0) of the data bus line detected by the inverter circuit 32 for detection of the threshold (Vs) is transmitted to the AND circuit 14a after a delay time of Δ in consideration of the operation margin of the input, output port circuits, thereby making the output port circuit nonactive. That is, the Nch transistors 240(1) to 240(n+1) of the output port circuit 24 become OFF, and the discharge of the data bus lines 10(1) to 10(n) and the sensing line 10(n+1) stops, and the undesired potential drop of the data bus lines is arrested.

At the same time, the output 30 of the AND circuit becomes LOW (=0), and the Pch transistors 20(1) to 20(n+1) become ON, and the data bus lines 10(1) to 10(n) and the sensing line 10(n+1) are set in the initial potential by precharge.

Figure 3:
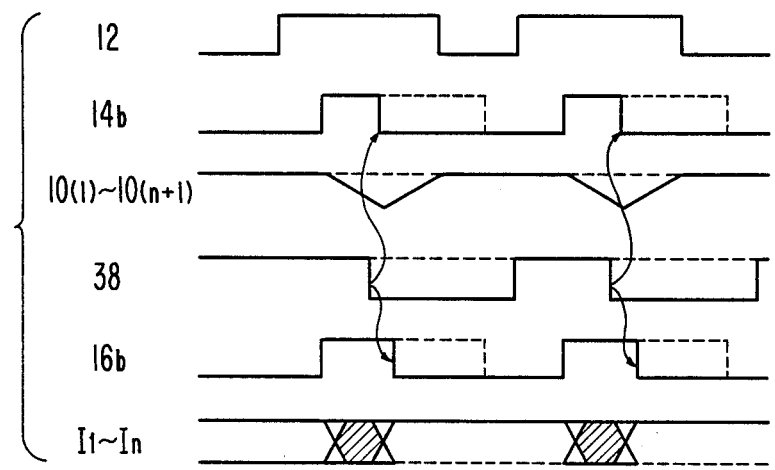
FIG. 3 is a timing chart showing potential changes in the essential parts of the bus circuit.

These potential changes in the essential parts in FIG. 1 are shown in the timing chart in FIG. 3.

It is also clear from this timing chart that a high speed data transfer cycle is realized as the voltage drop is arrested at the midway point without a full amplitude swing of the data bus lines 10(1) to 10(n) between the supply voltage (V DD) and the grounding voltage (V GND) owing to the firm signal, like in a conventional circuit.

In this way, it is possible to arrest the unnecessary potential changes of the data bus lines by detecting the potential changes of the dummy unit provided in the output port circuit 24 and the data bus lines 10(1) to 10(n) caused by this unit, delivering a data firm signal 38 on the data bus lines, and stopping the drive of the data bus lines by the output port circuit 24 by this firm signal 38. Therefore, the data bus line initialization for next data transfer can be affected at a high speed, and the data transfer cycle is realized between plural functional blocks.

Figure 4:
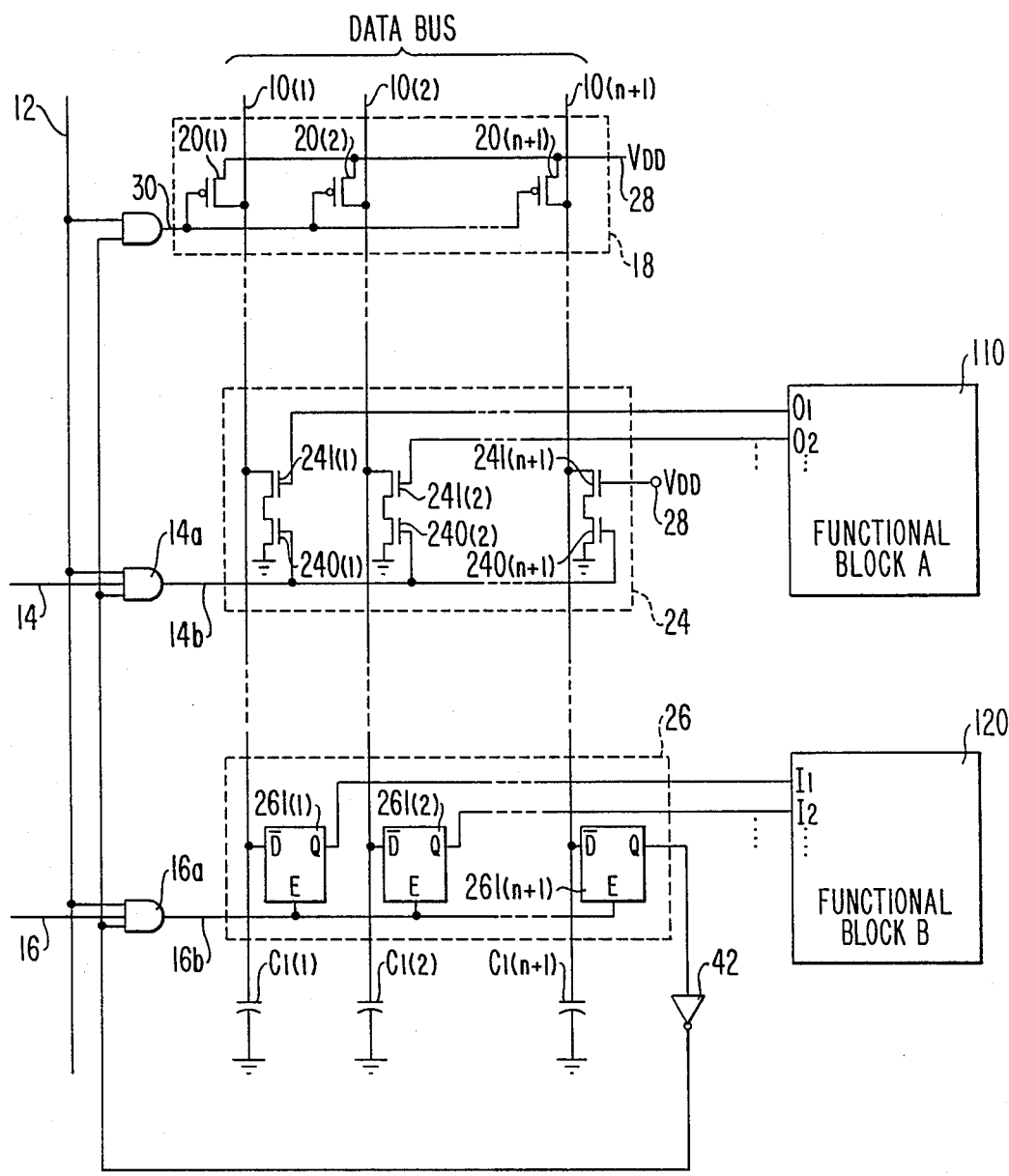
FIG. 4 is a logic diagram showing the schematic structure of a second embodiment.

In this embodiment, meanwhile, the data firm judging circuit 40 is composed of an inverter circuit 32 for detection of the threshold (Vs) and the delay circuit, but this is not limitative, and it is also possible, as shown in FIG. 4, to make use of the output Q of the dummy circuit 261(n+1) provided in the input port circuit 26. In this case, similar effects can be obtained by feeding the output of the dummy circuit into the input port circuit 26, output port circuit 24, and precharge circuit 18 by way of a proper buffer circuit 42.

Figure 5:
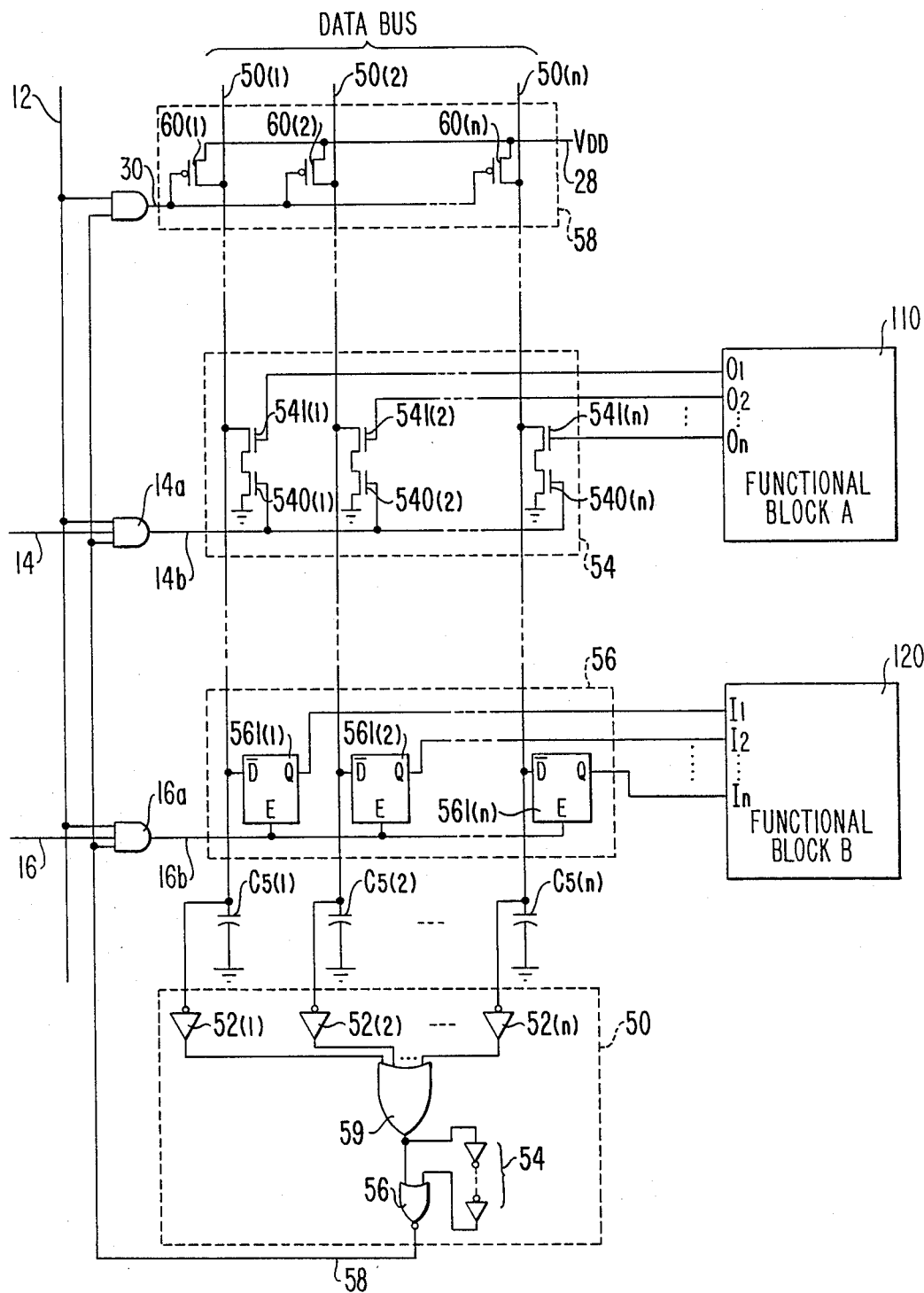
FIG. 5 is a logic diagram showing the schematic structure of a third embodiment of a bus circuit of this invention.

A logic diagram of schematic structure of a third embodiment of this invention is given in FIG. 5.

In the third embodiment, the sensing line is not used, but, instead, all of the data bus lines 50(1) to 50(n) are furnished with the same threshold detecting inverter circuits 52(1) to 52(n) as in the first embodiment, and the outputs of these inverter circuits 52(1) to 52(n) are fed into the OR circuit 59.

That is, even if one bit of the output data (O1, O2, ..., On) delivered to these data bus lines 50(1) to 50(n) is 1(HIGH), this signal is delivered, same as in the first embodiment, as a data firm signal 58 through the OR circuit 59 and NOR circuit 56. By this firm signal 58, therefore, the undesired voltage drop of data bus lines can be inhibited.

Figure 6:
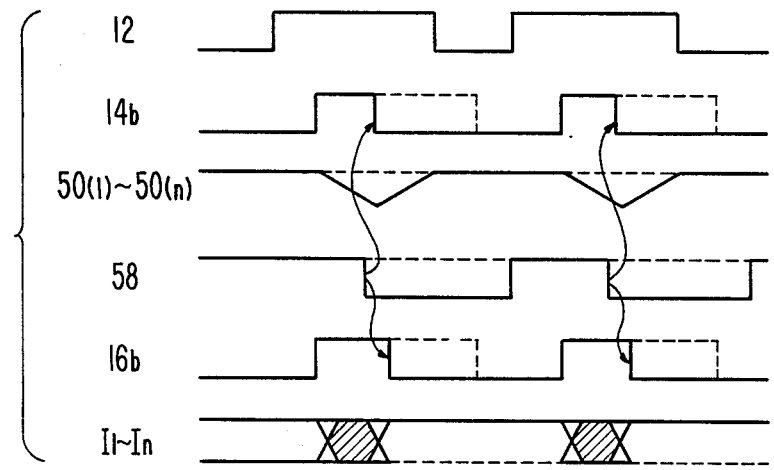
FIG. 6 is a timing chart showing potential changes in the essential parts of the bus circuit.

FIG. 6 shows the potential changes of the essential parts in this construction.

If, for example, all output data (O1, O2, ..., On) are 0(=LOW), unlike the first embodiment, the firm signal 58 is not delivered. At this time, however, since all data bus lines 50(1) to 50(n) remain set at the initial potential, the essential parts have the potentials as indicated by the broken lines in FIG. 6, and it is not necessary to again precharge the data bus lines for the next data transfer, and the data transfer cycle can be shortened.

That is, in the third embodiment, too, the data transfer cycle can be shortened.

In the foregoing embodiments, the CMOS circuit is explained as the circuit composition, but this is not limitative, and, for example, either Nch transistors or Pch transistors only may be used. Additionally, the construction of the precharge circuit and the input, output port circuits is not limited to the organization described in the embodiments.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A bus circuit comprising:
    a plurality of data bus lines and at least one sensing line;
    a potential initializing means for setting an initial potential of said plurality of data bus lines and said sensing line;
    an output port circuit for supplying data to said plurality of data bus lines upon receiving an output control signal;
    a discharging means for discharging said sensing line upon receiving said output control signal;
    an input port circuit for receiving data from said plurality of data bus lines;
    a data firm judging circuit coupled to said sensing line for detecting a potential change of said sensing line and for generating a judgement signal, said data firm judging circuit including:
        an inverter circuit for detection of a threshold voltage of said sensing line, a delay means for delaying an output of said inverter circuit, and a NOR circuit for receiving an output of said delay circuit and said output of said inverter circuit, wherein said judgement signal is generated at said output of said NOR circuit; and, a control means for deactivating said output port circuit in response to said judgement signal.

2. A bus circuit comprising:
a plurality of data bus lines;
a potential initializing means for setting an initial potential of said plurality of data bus lines upon receiving a precharge control signal;
an output port circuit for supplying data to said plurality of data bus lines upon receiving an output control signal;
an input port circuit for receiving data from said plurality of data bus lines;
a data firm judging circuit coupled to each of said data bus lines for detecting a potential change of at least one of said data bus lines and for generating a judgement signal, said data firm judging circuit including:
  inverter circuits coupled to each of said data bus lines for detection of a threshold voltage, an OR circuit having as inputs said inverter circuits, a delay means for delaying an output of said OR circuit, and a NOR circuit having as inputs and output of said delay means and said output of said OR circuit, wherein said judgement signal is generated at an output of said NOR circuit; and,
a control means for deactivating said output port circuit in accordance with said judgement signal from said data firm judging circuit.

3. A bus circuit comprising:
a plurality of data bus lines and at least one sensing lines;
a potential initializing means for setting an initial potential of said plurality of data bus lines and said sensing line upon receiving a precharge control signal;
an output port circuit for supplying data to said plurality of data bus lines upon receiving an output control signal;
a discharging means for discharging said sensing line upon receiving said ouput control signal;
an input port circuit for receiving data from said plurality of data bus lines,
  a data firm judging circuit coupled to said sensing line for detecting a potential change of said sensing line and for producing a judgement signal;
  a control means for deactivating said output port circuit in accordance with judgement signal from said data firm judging circuit, and for activating said potential initializing means to precharge said plurality of data bus lines and said sensing line in accordance with said judgement signal from said data firm judging circuit.

4. A bus circuit comprising:
a plurality of data bus lines;
a potential initializing means for setting an initial potential of said plurality of data bus lines upon receiving a precharge control signal;
an output port circuit for supplying data to said plurality of data bus lines upon receiving an output control signal;
an input port circuit for receiving data from said plurality of data bus lines;
a data firm judging circuit coupled to said data bus lines for detecting a potential change of at least one of said data bus lines and for producing a judgement signal;
a control means for deactivating said output port circuit in accordance with judgement signal from said data firm judging circuit, and for activating said potential initializing means to precharge said plurality of data bus lines and said sensing line in accordance with said judgment signal from said data firm judging circuit.

* * * * *